Aug. 18, 1970     J. A. MORRIS     3,524,604
KNOCK-DOWN REEL
Filed Dec. 11, 1968     2 Sheets-Sheet 1
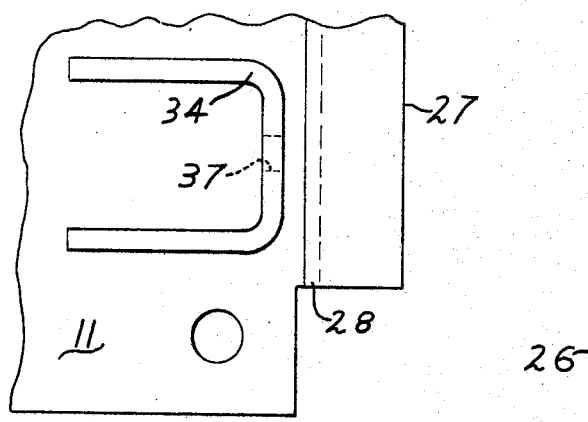
Fig. 9
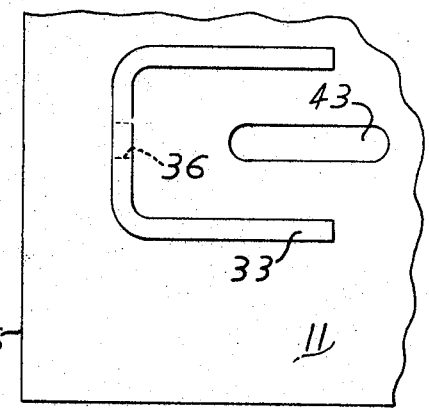
Fig. 10
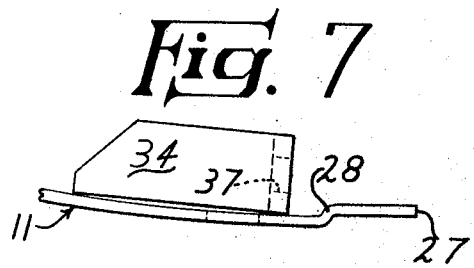
Fig. 7
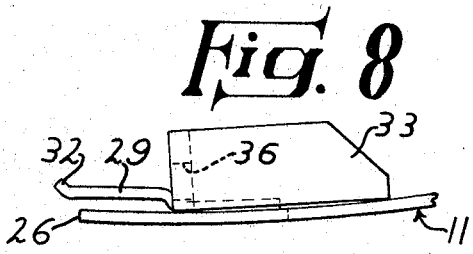
Fig. 8
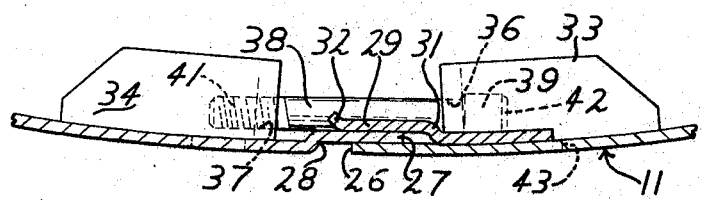
Fig. 6
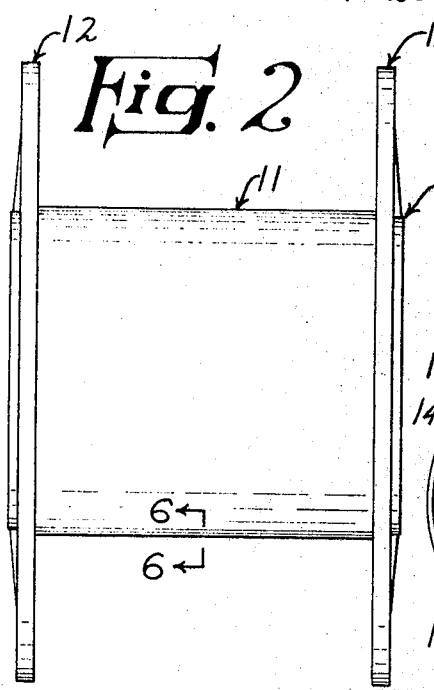
Fig. 2
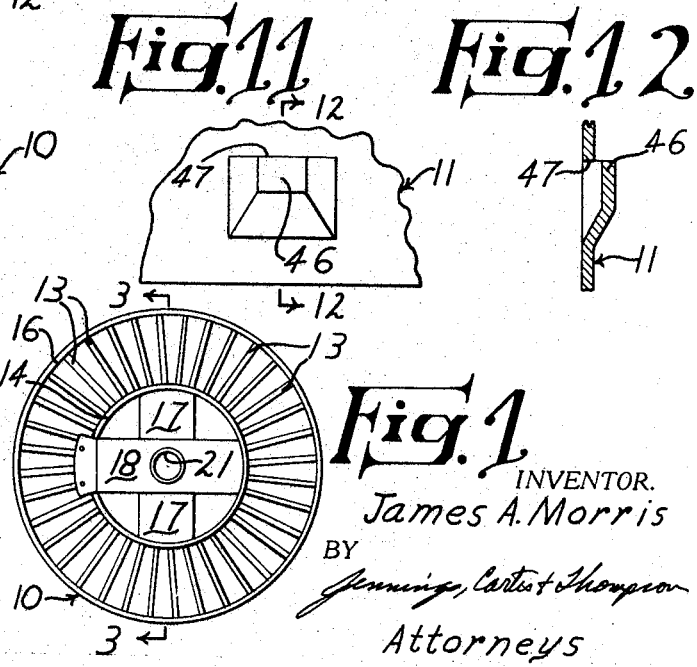
Fig. 11
Fig. 12
Fig. 1
INVENTOR.
James A. Morris
BY
Jennings, Carter & Thompson
Attorneys

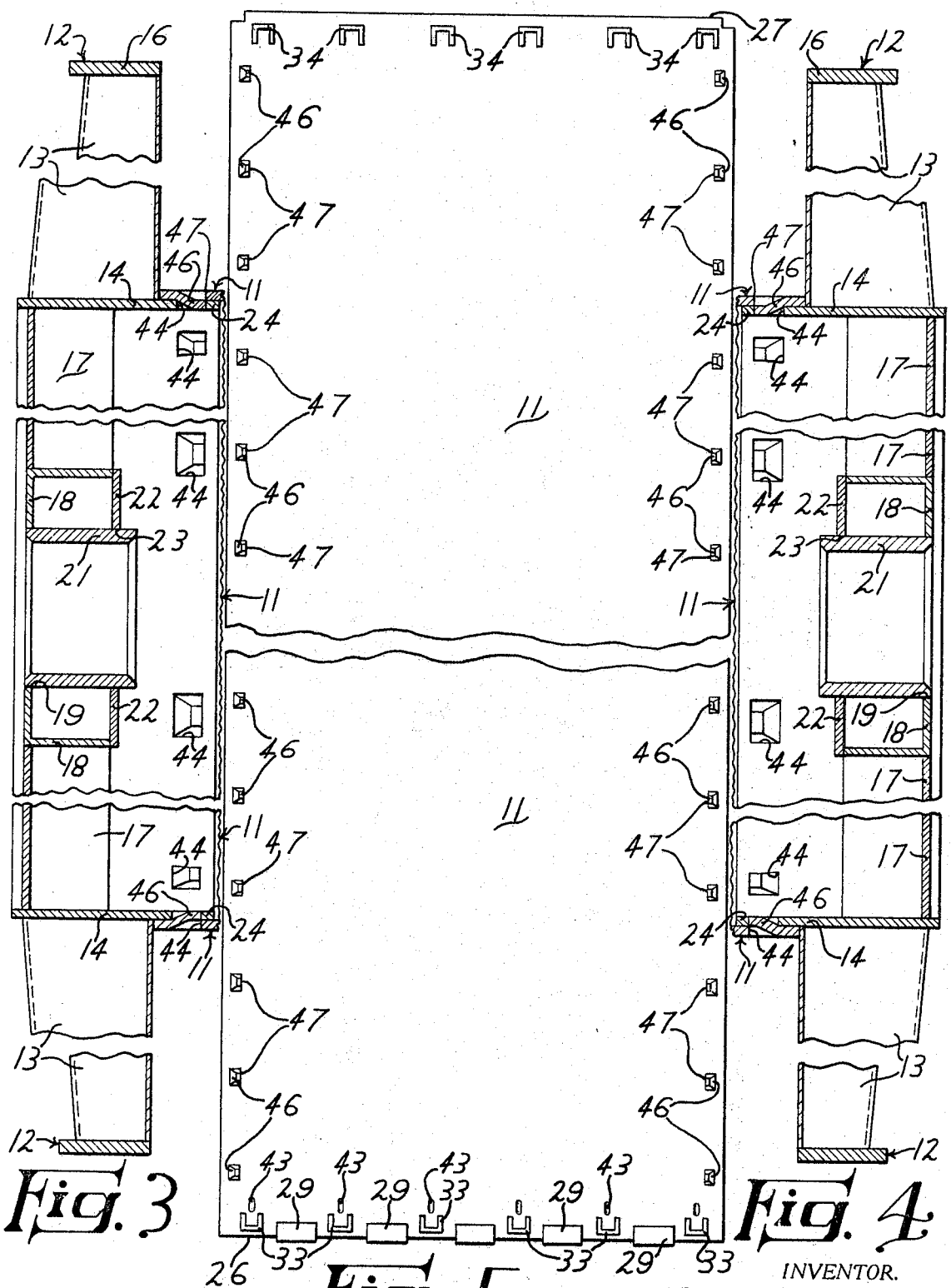

United States Patent Office 3,524,604
Patented Aug. 18, 1970

3,524,604
KNOCK-DOWN REEL
James A. Morris, Decatur, Ala., assignor to Metco,
Incorporated, a corporation of Alabama
Filed Dec. 11, 1968, Ser. No. 782,837
Int. Cl. B65h 75/18
U.S. Cl. 242—115         10 Claims

ABSTRACT OF THE DISCLOSURE

A knock-down reel having split sleeve-like drum movable to an extended position and a contracted position. Disc-like heads at each end of drum having inwardly extending flanges which engage inner surface of drum while drum is in contracted position. Cooperating locking elements carried by flanges and ends of drum engage each other securing heads to drum.

BACKGROUND OF THE INVENTION

This invention relates to a knock-down reel and more particularly to reels adapted for storing and shipping wire and cable-like members.

As is well known in the art to which my invention relates, considerable expense is incurred in returning empty reels to the manufacturer of cable-like products due to the fact that with empty reels, considerable space is wasted between the heads of the reel and within the interior of the drum portion of the reel. While various type of collapsible reels have been proposed, such reels have not been entirely satisfactory due to the fact that the components of such reels often are accidentally released or may be released by vandals before the cable-like member is removed therefrom. This not only requires considerable time and labor to reassemble the reel and its cable-like product but the components of the reel and the cable-like member wound thereon are often damaged. A further disadvantage in collapsible reels heretofore employed has been the fact that considerable time and effort is required to assemble and disassemble the reels since through bolts must be removed or installed, as the case may be.

BRIEF SUMMARY OF INVENTION

To overcome the above and other difficulties, I provide a knock-down reel which may be assembled and disassembled in a minimum of time and at the same time will withstand the most severe handling and will accommodate wire or cable-like members of any size. The reel has a split sleeve-like drum which is movable selectively to an extended position and a contracted position. Disc-like heads are provided at each end of the drum. Inwardly extending flanges are carried by each head in position to engage the inner surface of the drum upon movement of the drum to contracted position. Cooperating locking elements carried by the flanges and the ends of the drum form a positive lock which secures the drum to the heads thus restraining both axial and radial movement of the drum and heads relative to each other. The reel cannot be knocked down when loaded with cable due to the fact that the release means is accessible from the outside of the drum, thus preventing accidental release or release by vandals. Apparatus embodying features of my invention is illustrated in the accompanying drawings, forming a part of this application, in which:

FIG. 1 is an end elevational view of the reel assembled;

FIG. 2 is an enlarged, side elevational view of the reel shown in FIG. 1;

FIG. 3 is an enlarged, fragmental view taken generally along the line 3—3 of FIG. 1 and showing the head at one side of the reel and the manner in which it is connected to the adjacent end of a sleeve-like drum;

FIG. 4 is a fragmental sectional view corresponding to FIG. 3 but showing the head at the opposite side of the reel;

FIG. 5 is a view showing the inner surface of the sleeve-like drum before the drum is moved to a cylindrical shape;

FIG. 6 is an enlarged, fragmental view taken generally along the line 6—6 of FIG. 2;

FIG. 7 is a fragmental, side elevational view showing one end of the split sleeve-like drum removed from the other end thereof;

FIG. 8 is a fragmental, side elevational view showing the other end of the sleeve-like drum from that shown in FIG. 7;

FIG. 9 is a fragmental, top plan view of the end of the sleeve-like drum shown in FIG. 7;

FIG. 10 is a fragmental, top plan view showing the corner portion only of the end of the split sleeve-like drum shown in FIG. 8;

FIG. 11 is an enlarged, fragmental view showing one of the angularly spaced projections carried by the inner surface of the sleeve-like drum; and, FIG. 12 is a fragmental view taken generally along the line 12—12 of FIG. 11.

Referring now to the drawings for a better understanding of my invention, I show my improved knock-down reel generally at 10 which comprises a split sleeve-like drum 11 connected at its ends to radially extending reel heads 12 which are formed of annular, corrugated or fluted members 13, as shown in FIG. 1, and are reinforced by inner and outer rings 14 and 16. Secured to the inner rings 14, as shown in FIGS. 1, 3 and 4, are support members 17 and 18 which are generally U-shaped, as viewed in cross section. The U-shaped member 18 extends from one side of the inner ring 14 to the other side thereof while the support member 17 comprises two sections which are secured to the support member 18 at the point of juncture of the support member 17 with support member 18, by suitable means, such as by welding. A centrally disposed opening 19 is provided in the support member 18 for receiving a hub member 21 which is positioned coincident with the axis of rotation of the reel 10. A generally square reinforcing member 22 is secured to the inner ends of the legs of the U-shaped support member 18, as shown in FIGS. 3 and 4, and is provided with a centrally disposed opening 23 for receiving the hub 21. The reinforcing member 22 is also rigidly secured to the hub 21 by welding or the like. By providing the support members 17 and 18 which are generally U-shaped, as viewed in cross section, together with the reinforcing member 22, I provide a very sturdy connection between the hub members and the reel heads which withstands the weight of the cable and the rough usage normally experienced with such reels.

As shown in FIGS. 3 and 4, the inner rings 14 extend inwardly of the corrugated head sheets 13 to provide an annular flange 24 which is adapted to extend inwardly of the edges of the split sleeve-like drum 11 upon movement of the drum to contracted position. That is, the sleeve-like drum 11 is provided with at least one transverse slit therein to provide free ends 26 and 27 which are adapted to overlap each other, as shown in FIG. 6, upon drawing the free ends of the sleeve-like drum 11 into engagement with each other to form a generally cylindrical drum for the reel. Preferably, the end portion 27 of the sleeve-like member 11 is off-set as at 28 relative to the remainder of the sleeve-like member 11 whereby it extends alongside the inner surface of the end portion 26. As shown in FIGS. 5, 6 and 8, spaced apart clip members 29 are secured to the sleeve-like drum 11 inwardly of the end 26. Each clip member 29 is off-set as at 31 whereby the free end of the clip member is in position to extend alongside the inner surface of the off-set end portion 27 whereby the end portion 27 is retained between the free end 26 of the sleeve-like drum 11 and the free ends of the clip members 29. Preferably, the free end of clip member 29 is turned inwardly as at 32 to facilitate movement of the end 27 into the space defined between the end member 26 and the clip member 29.

Secured to the sleeve-like drum 11 inwardly of the free end 26 thereof are a plurality of laterally spaced brackets 33 which are U-shaped, as viewed in plan. In like manner, a plurality of spaced brackets 34 are secured to the sleeve-like drum 11 inwardly of the free end 27. The brackets 34 are also U-shaped, as viewed in plan. Aligned openings 36 and 37 are provided in the base portions of the U-shaped brackets for receiving a retaining member 38 which may be in the form of an elongated member having a head 39 at one end thereof and threads 41 at the other end thereof in position to engage threads provided on the inner surface of opening 37. A transverse slot 42 is provided in the head 39 for receiving a suitable tool, such as a screwdriver whereby the member 38 may be rotated to move the brackets 33 and 34 toward or away from each other. An access opening 43 is provided inwardly of each U-shape bracket 33, as shown in FIGS. 5, 6 and 10. Since the brackets 33 and 34 are mounted on the inner surface of the sleeve-like drum 11 and the access openings 43 are provided through the drum, the threaded members 38 cannot be rotated until the wire or cable-like member is removed from the drum 11 to thus expose the access openings 43. Accordingly, the retaining elements 38 cannot be accidentally released or released by vandals while the cable-like member is wound on the reel.

As shown in FIGS. 3 and 4, angularly spaced recesses or openings 44 are provided in each annular flange 24 in position to receive inwardly extending projections 46 carried by the sleeve-like drum 11. The projections 46 are provided along the edges of each side of the sleeve-like member 11, as shown in FIGS. 3, 4 and 5, 11 and 12, and are spaced longitudinally from each other a distance to register with the openings 44 in the annular flanges 24. Preferably, the inwardly extending projections 46 are formed by slitting the sleeve-like drum as at 47 whereby the slit facilitates deformation of the adjacent portion of the sleeve-like drum 11 to form the projection 46 therein, as clearly shown in FIGS. 11 and 12. By providing the slit 47 the inwardly extending projection 46 is provided with a straight edge adjacent the slit which is adapted to engage a corresponding straight edge along the inner side of the opening 44 provided in the annular flange 24, thus positively locking the sleeve-like drum 11 to the annular flange 24 upon drawing the ends 26 and 27 of the sleeve-like drum 11 toward each other by rotation of the member 38. That is, with the inwardly extending projections 46 interlocked within the openings 44, the sleeve-like drum 11 is held against both axial and radial movement relative to the flanges 24 and the reel heads 12.

From the foregoing description, the operation of my improved knock-down reel will be readily understood. To assemble the reel, the sleeve-like drum 11 is moved from the position shown in FIG. 5 to the positions shown in FIGS. 2, 3, 4 and 6 whereby the edges of the drum 11 surround the annular flanges 24 carried by the reel heads 12. That is, the sleeve-like drum 11 moves from an extended position to a contracted, cylindrical position. The split sleeve-like member 11 and the heads 12 are rotated relative to each other to move the inwardly extending projections 46 into register with the openings 44 provided in the annular flanges 24. With the projections 46 in interlocked relation with the opening 44, the retaining members 38 are rotated by inserting a suitable tool, such as screwdriver, through openings 43 whereby the tool engages the recess 42 in the retaining member 38 to thereby impart rotation thereto. As the ends 26 and 27 of the split sleeve-like member 11 are drawn inwardly toward each other, the end portion 27 moves inwardly between the end portion 26 and the clip member 29, as shown in FIG. 6, whereby the adjacent ends of the sleeve-like member 11 are drawn inwardly toward each other to thus positively secure the sleeve-like member 11 to the annular flanges 24 of the heads 12. With the reel thus assembled, wire or cable-like members are wound thereon in the usual manner. After the cable-like member or wire has been removed from the reel, the reel is disassembled by inserting a screwdriver or the like through the openings 43 whereupon the retaining members 38 are rotated to move the ends 26 and 27 of the sleeve-like drum away from each other, thus causing the inwardly extending projections 46 to move out of engagement with the openings 44 whereupon the heads 12 may be readily separated from the split sleeve-like drum 11. The sleeve-like drum 11 may be nested with other sleeve-like drums while the drums are in an arcuate shape or the sleeve-like drums 11 may be moved to a generally flat position. Preferably, the sleeve-like drums are nested while the drums are in an arcuate position to facilitate movement of the drums back to the cylindrical shape about the annular flanges 24.

From the foregoing, it will be seen that I have devised an improved knock-down reel in which there is a positive lock between the annular flanges of the reel heads and the drum carried thereby. By providing access openings 43 for releasing the retaining members 38 only after the cable-like member has been removed from the reel, the reel may be assembled and disassembled in a minimum of time and at the same time I eliminate entirely the possibility of accidental release or release by vandals of the retaining elements 38. Also, by providing a knock-down reel in which the only loose pieces are the inexpensive retaining members 38, which would not be normally returned to the manufacturer, I greatly reduce the chances of the components of the reel being lost during shipment or storage. Furthermore, by providing a knock-down reel wherein a sleeve-like drum is separated entirely from the heads, damaged flanges on the drums can be easily replaced and drum repairs can be easily accomplished when knocked down. Furthermore, by providing a knock-down reel in which the heads are entirely separable from the sleeve-like drum, the length of the drum may be readily varied by inserting drums of various lengths without changing the heads. In like manner, the size of the annular flange may be readily varied for accommodating a given drum size. By providing a knock-down reel wherein the drum members may be nested and the heads stacked adjacent each other, I greatly reduce the space required for shipping and storage.

While I have shown my invention in but one form, it will be obvious to those skilled in the art that it is not so limited, but is susceptible of various other changes and modifications without departing from the spirit thereof.

What I claim is:

1. In a knock-down reel for packaging cable-like members:
    (a) a sleeve-like drum having at least one transverse slit therein permitting said drum to move selectively to an extending position and to a contracted position,
    (b) disc-like reel heads at opposite ends of said sleeve-like drum,
    (c) curved flanges carried by and extending inwardly of said disc-like heads in position for each flange to extend inwardly of an adjacent end of said sleeve-like drum while said sleeve-like drum is in an extended position and to engage the inner surface of said sleeve-like drum upon movement of said sleeve-like drum to contracted position,
    (d) cooperating locking elements carried by said curved flanges and the adjacent ends of said sleeve-like drum disposed to engage each other and secure said disc-like heads to said sleeve-like drum while said drum is in said contracted position about said curved flanges, and (e) releasable means carried by said sleeve-like drum adjacent said slit retaining said sleeve-like drum in said contracted position about said curved flanges and holding said sleeve-like drum against axial and radial movement relative to said disc-like heads.

2. A knock-down reel as defined in claim 1 in which said curved flanges are annular flanges carried by the inner surfaces of said disc-like heads and concentric with the axis of rotation of said heads.

3. A knock-down reel as defined in claim 1 in which at least one end of said sleeve-like member at one side of said transverse slit is off-set relative to the end of said sleeve-like member at the opposite side of said transverse slit so that said ends at opposite sides of said transverse slit overlap each other.

4. A knock-down reel as defined in claim 1 in which said cooperating locking elements which engage each other to secure one member to another member comprises:
 (a) angularly spaced recesses in one member, and
 (b) angularly spaced projections carried by the other member in position to engage said recess upon movement of said sleeve-like drum to contracted position.

5. A knock-down reel as defined in claim 4 in which each said angularly spaced projection is a key member defined by a deformation in said other member.

6. A knock-down reel as defined in claim 5 in which a slit is provided in said other member adjacent the inner side of said key member to facilitate formation of said key member.

7. A knock-down reel as defined in claim 1 in which said releasable means adjacent said slit in the sleeve-like drum comprises:

(a) pairs of oppositely disposed brackets carried by and extending inwardly of said sleeve-like drum at opposite sides of said transverse slit, and (b) adjustable means connecting said brackets of each pair of brackets to each other and adapted to move said brackets toward and away from each other to thereby move said sleeve-like member selectively toward said extended position and said contracted position.

8. A knock-down reel as defined in claim 7 in which said adjustable means comprises a threaded member, there being aligned openings through said oppositely disposed brackets for receiving said threaded member.

9. A knock-down reel as defined in claim 7 in which said oppositely disposed brackets are generally U-shaped with the bases of said U-shaped brackets facing said transverse slit and having said aligned openings therein.

10. A knock-down reel as defined in claim 7 in which said sleeve-like drum is provided with access openings therethrough in alignment with said adjustable means whereby said adjustable means may be rotated by a tool inserted through said access openings.

References Cited
UNITED STATES PATENTS 1,287,857  12/1918  Brandt _____ 242—118.62
1,742,584  1/1930  Daubmeyer et al. ____ 242—115

GEORGE F. MAUTZ, Primary Examiner

U.S. Cl. X.R.

242—77.3, 118.8